United States Patent
Lenk

(10) Patent No.: US 8,425,178 B2
(45) Date of Patent: Apr. 23, 2013

(54) FAN CASING FOR A JET ENGINE

(75) Inventor: Olaf Lenk, Berlin (DE)

(73) Assignee: Rolls-Royce Deutschland Ltd & Co KG (DE)

(*) Notice: Subject to any disclaimer, the term of this patent is extended or adjusted under 35 U.S.C. 154(b) by 657 days.

(21) Appl. No.: 12/639,181

(22) Filed: Dec. 16, 2009

(65) Prior Publication Data

US 2010/0150696 A1 Jun. 17, 2010

(30) Foreign Application Priority Data

Dec. 17, 2008 (DE) .......................... 10 2008 062 363

(51) Int. Cl.
*F01D 21/00* (2006.01)

(52) U.S. Cl.
USPC ...... 415/9; 415/173.1; 415/173.3; 415/173.4; 415/174.2; 415/197; 415/200

(58) Field of Classification Search .......... 415/9, 173.1, 415/173.3, 173.4, 174.2, 174.4, 197, 200
See application file for complete search history.

(56) References Cited

U.S. PATENT DOCUMENTS

| 4,273,824 A | 6/1981 | McComas et al. |
| 4,377,370 A | 3/1983 | Porcelli |
| 4,547,122 A | 10/1985 | Leech |
| 4,818,176 A | 4/1989 | Huether et al. |
| 4,902,201 A | 2/1990 | Neubert |
| 4,934,899 A | 6/1990 | Patacca |
| 5,408,826 A | 4/1995 | Stewart et al. |
| 5,431,532 A | 7/1995 | Humke et al. |
| 6,053,696 A | 4/2000 | Roberts |
| 6,979,172 B1* | 12/2005 | Mackenzie ................. 415/9 |
| 7,246,990 B2 | 7/2007 | Xie et al. |
| 7,390,161 B2 | 6/2008 | Xie et al. |
| 2005/0271503 A1* | 12/2005 | Harper et al. ............. 415/170.1 |
| 2009/0067979 A1* | 3/2009 | Braley et al. ................ 415/9 |
| 2009/0087309 A1* | 4/2009 | Schreiber ................... 415/200 |

FOREIGN PATENT DOCUMENTS

| DE | 411985 | 1/1925 |
| DE | 3712829 | 11/1988 |
| DE | 3814954 | 11/1989 |
| DE | 19640654 | 4/1998 |
| DE | 69914083 | 7/2004 |
| DE | 102006041321 | 3/2008 |
| EP | 1674671 | 6/2006 |
| GB | 2049484 | 12/1980 |
| GB | 2289720 | 11/1995 |
| WO | 2008/061759 | 5/2008 |

* cited by examiner

*Primary Examiner* — Igor Kershteyn

(74) *Attorney, Agent, or Firm* — Timothy J. Klima; Shuttleworth & Ingersoll, PLC

(57) ABSTRACT

A fan casing (2) for a jet engine has a burst protection arrangement (7) made up of layers at least in an area of fan blades (5). To contain detached fan blades (5) within a fan casing (2) of a jet engine by use of a low-weight and easily manufacturable burst protection arrangement (7), the fan casing (2) is made of a fiber-composite material which itself forms at least one layer provided with at least one inorganic, non-metallic protective layer (8).

19 Claims, 2 Drawing Sheets

FAN CASING FOR A JET ENGINE

This application claims priority to German Patent Application DE102008062363.6 filed Dec. 17, 2008, the entirety of which is incorporated by reference herein.

This invention relates to a fan casing for a jet engine.

In the development and certification of a jet engine, various damage cases are to be taken into account. Among these damage cases is the detachment of a blade of the fan stage (fan blade). If this failure occurs, the detached fan blades shall not leave the jet engine to prevent the aircraft and the passengers from being damaged. For this, the kinetic energy of the detached fan blades must be absorbed by a suitable containment system (burst protection arrangement). Currently, the energy of the detached fan blades is dissipated by various design solutions.

With a current design solution, the fan casing of a jet engine is made of a highly ductile material which plastically deforms upon impact of a detached fan blade. Mostly, highly ductile steels or titanium alloys are here used. Depending on the casing material selected, the wall thickness and the impact parameters, different amounts of kinetic energy are dissipated by plastification of the fan casing. Generally speaking, larger casing wall thicknesses are capable of absorbing higher energy.

With another current design solution, the fan casing is made of a basic structure in a ductile material which plastically deforms upon impact of a detached fan blade. In addition, the fan casing includes a continuous circumferential strip in a material having high strength and high ductility. While the basic structure of the fan casing can be made of aluminum, titanium or steel, an aramid fiber (e.g. Kevlar©) is mostly used for the circumferential strip.

With yet another current design solution, the fan casing is made of a design of high strength and high stiffness causing the impinging fan blade to disintegrate in a defined manner. These—smaller—fragments of the fan blade are then transported out of the engine via the airflow.

The use of fiber-composite materials on fan casings is being promoted as they provide for the saving of weight. Owing to the high stiffness of fiber-composite materials, such embodiments are particularly suited for the latter design solution.

Fiber-composite materials are characterized by high strength in the fiber direction. It should, however, be noted that the fan blades impact vertically to said fiber direction. Therefore, it can be assumed that a considerable part of the structure of the fan casing will be destroyed. In order to meet the certification requirements, the thickness of the fan casing must accordingly be increased to make sure that the flight can be safely continued. This significantly increases the mass of the fan casing and reduces commercial efficiency.

Specification U.S. Pat. No. 4,377,370 discloses a fan engine equipped with a ring in the interior of the fan casing. This ring has a strong elastic inner envelope, a first ring made of wire windings, a second ring made of a deformable material, and an external envelope. This arrangement, however, requires high manufacturing effort.

Specification DE 196 40 654 A1 describes a burst protection arrangement for radial turbines of turbochargers which is formed by an inner circumferential containment ring and an outer helical sheet-metal shell. However, this design incurs an increased weight of the casing.

Specification DE 10 2006 041 321 A1 describes a fan casing with a metal ring mesh arranged on the outer or the inner circumference. The metal ring mesh with low weight may, however, be inadequate for the very high impact forces of the detached fan blades. An increase in the thickness of the metal ring mesh would, however, entail an increase in weight. Moreover, this arrangement involves high manufacturing effort.

In Specification DE 41 19 85 A1, a ballistic fabric is described which is attached to a fan casing. The ballistic fabric is made of synthetic fibers. This fabric too is costly to manufacture.

Specification WO 2008/061759 A1 discloses a specific mesh which is thrust stable in at least one direction in space. Such a mesh can also be used as a burst protection arrangement for fan casings. This mesh, however, also involves high manufacturing effort.

A broad aspect of this invention is to provide for the containment of detached blades within a fan casing of a jet engine by a low-weight and easily manufacturable burst protection arrangement.

It is a particular object of the present invention to provide a fan casing for a jet engine which has a burst protection arrangement made up of layers at least in the area of the fan blades. The fan casing is made of a fiber-composite material which itself forms at least one layer provided with at least one inorganic, non-metallic protective layer.

In order to increase the protective effect of a fan casing made of fiber-composite material, the impact energy of the detached fan blades must be distributed to obtain a load distribution as even as possible. Furthermore, incision of the impactor (detached fan blade) into the fiber composite must be reduced or avoided, respectively. Both are achieved by applying an inorganic, non-metallic protective layer on the fan casing.

The application of the inorganic non-metallic protective layer also permits the fiber-composite material to be made thinner. Thus, the weight of the fan casing can be reduced while its protection function is enhanced.

It is useful to make the protective layer of at least one ceramic material. Ceramic materials have a hard surface at which a detached fan blade is deformed and bounced off the fan casing. The deformation of the fan blade is also referred to as "mushrooming". Mushrooming provides for a large-area transfer of the impact energy onto the fan casing.

Preferably, the protective layer is made of at least one mineral material. Mineral materials have a high-strength surface causing the detached fan blade to deform and bounce off upon impingement, thereby hindering it from breaking through the fan casing. In addition, the mineral protective layer has low density which, together with the weight reduction resulting from the use of fiber-composite material, allows the total weight to be reduced.

In particular, the protective layer can be made of at least one stone foil. Stone foil is an easily available material particularly suited for forming a mineral protective layer on a fan casing. The abrasive properties of stone foil provide a good running surface in normal operation when the fan blades rub along the fan casing.

The protective layer can be provided on the outer side of the fan casing. This avoids that a detached fan blades completely breaks through the fan casing. The number of fiber-composite layers destroyed upon impact is significantly reduced. This allows the fan casing to be designed with fewer fiber-composite layers, which has a positive effect on the total weight.

In addition, a honeycomb structure can be provided on the inner side of the fan casing. The honeycomb structure serves to absorb part of the impact energy of the detached fan blade.

Alternatively, the protective layer can be provided on the inner side of the fan casing. This hinders a detached fan blade from entering the fiber-composite material of the fan casing.

The detached fan blade is deformed ("mushroomed") without damaging the fiber-composite material of the fan casing. This permits the fan casing to have fewer layers of fiber-composite material and, consequently, be reduced in weight.

Preferably, the protective layer is attached to the fiber-composite material of the fan casing by use of at least one adhesive. The adhesive ensures firm connection of the protective layer to the fiber-composite material of the fan casing.

Alternatively, the protective layer is attached to the fiber-composite material of the fan casing by ultrasonic techniques. Here, no additional adhesive material is required. In particular, ultrasonic welding is characterized by low welding times and high efficiency.

Furthermore, the burst protection arrangement can include a ductile layer. The ductile layer is capable of retaining possibly breaking-through impactors (detached fan blades). Accordingly, the ductile layer further increases the failure safety of the fiber-composite material.

In particular, the ductile layer has at least one layer of a mesh of metallic rings wound in a continuous strip around the fiber-composite material of the fan casing with the protective layer. Such a mesh is well suited to retain impactors if they break through the protective layer and the fiber-composite material.

The metallic rings of the mesh can be made of aluminum, titanium, steel and/or alloys of these metals. These metals are highly ductile and therefore well suited for the mesh.

Furthermore, the mesh of metallic rings can be fitted in a bedding substance. The bedding substance provides the mesh with stability of form.

Finally, at least one sound-absorbing lining can be provided on the inner side of the fan casing. This lining dampens the propagation of sound when the impactors hit the burst protection arrangement.

In the following, one embodiment of the present invention is more fully described in light of three figures.

Figure 1:
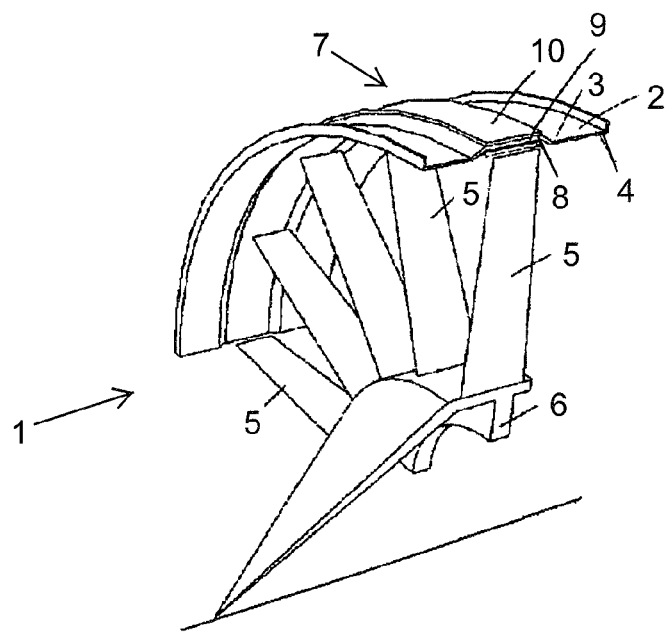
FIG. 1 is a perspective schematic view of a segment of a fan.

FIG. 1 shows a perspective schematic view of a fan 1 for a jet engine. The fan 1 includes a fan casing 2, fan blades 5, a fan disk 6 and a burst protection arrangement 7.

The fan 1 is of rotationally symmetric design. Disposed in the center of the fan 1 is the fan disk 6 onto which the fan blades 5 are radially arranged. The fan casing 2 is essentially cylindrical and axially extends beyond the fan blades 5. The burst protection arrangement 7 is disposed in the area of the fan blades 5.

Figure 2:
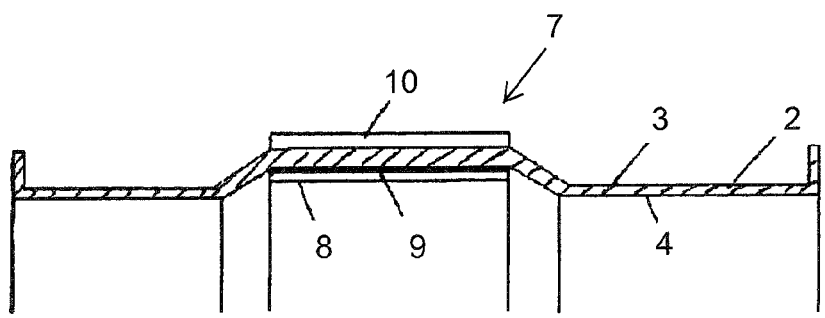
FIG. 2 is a sectional view of a fan casing with burst protection arrangement.

FIG. 2 is a sectional view of the fan casing 2 with burst protection arrangement 7 in enlarged representation.

The fan casing 2 in FIGS. 1 and 2 has an outer side 3 and an inner side 4. The burst protection arrangement 7 includes a protective layer 8, an adhesive 9 and a ductile layer 10.

The protective layer 8 is attached to the inner side 4 of the fan casing 2 by the adhesive 9. The ductile layer 10 is attached to the outer side 3 of the fan casing 2.

The fan casing 2 is made of a fiber-composite material. The fiber-composite material includes continuous carbon fibers or glass fibers or a mixture of both fiber types (mixture proportions of 0% to 100%). The fiber volume content is between 40% and 80%. Fiber orientation and fiber layer structure in the fan casing are freely variable. As manufacturing methods, winding technology, resin injection process, hand lay-ups and autoclave processes may be used. The possible manufacturing methods are, however, not limited to those specified in the above.

The protective layer 8 is formed by a mineral material, e.g. stone foil made of granite or other stone or a mineral coating. The typical thickness of the protective layer 8 ranges from 0.2 mm to 5.0 mm. Other thicknesses are also possible. During manufacture, the protective layer 8 is flatly attached to the fiber-composite material of the fan casing 2, for example by the adhesive 9.

The ductile layer 10 is formed by a mesh 11 of metallic rings 12 which may be fitted in a bedding substance made of any material. The mesh 11 is wound around the fan casing 2 in one or several layers.

Figure 3:
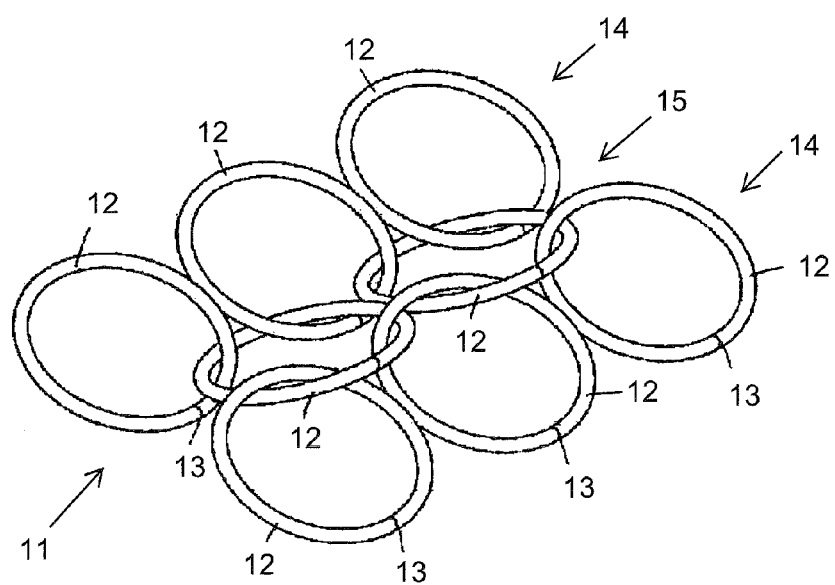
FIG. 3 shows a portion of a mesh of rings.

In FIG. 3, the mesh 11 of metallic rings 12 is shown in more detail. The metallic rings 12 are arranged in parallel rows 14 and 15, with the rows 14 being arranged on both sides of the row 15. The rings 12 of the rows 14 engage the rings 12 of the row 15. The mesh 11 is produced in that the initially open rings 12 are fitted into each other and then closed at the welds 13. The size of the rings 12 is not limited as regards the ring diameter and the ring wire thickness. The ring shape is also optional.

In operation, foreign objects may enter the fan 1 and impact on the fan blades 5. In the process, whole fan blades 5 or fragments thereof can get detached. These are slung radially outwards by the rotational energy, forming impactors. The impactors impinge on the burst protection arrangement 7 with high energy.

The protective layer 8 effects that the impactors are mushroomed, i.e. the impactors are deformed such that they are upset in the area in which they impinge on the protective layer 8. The protective layer 8 therefore serves for energy absorption in the direct impingement zone of the fan blades 5.

This saves the fiber-composite material of the fan casing 2, which is the basic structure and, thus, the load path under all operating conditions. The impactors remain in the interior of the fan casing 2 and are removed in flow direction by the airflow not shown. Should an impactor nevertheless break through the protective layer 8 and the fiber-composite material of the fan casing 2, containment of the impactors will provided by the ductile layer 10 as break-through protection.

LIST OF REFERENCE NUMERALS

1 Fan
2 Fan casing
3 Outer side
4 Inner side
5 Fan blade
6 Fan disk
7 Burst protection arrangement
8 Protective layer
9 Adhesive
10 Ductile layer
11 Mesh
12 Ring
13 Weld
14 Row
15 Row

What is claimed is:
1. A fan casing for a jet engine, comprising:
a fiber-composite material layer at least in an area of fan blades of the engine; and at least one inorganic, non-metallic protective layer positioned radially adjacent the fiber-composite material layer at least in the area of the fan blades to form, with the fiber-composite material layer, a multi-layer burst protection arrangement;
wherein the protective layer is formed by at least one stone foil.

2. The fan casing of claim 1, wherein the fan casing is made of the fiber-composite material to form the fiber-composite layer.

3. The fan casing of claim 2, wherein the protective layer is made of at least one ceramic material.

4. The fan casing of claim 2, wherein the protective layer is made of at least one mineral material.

5. The fan casing of claim 1, wherein the protective layer is positioned on an outer side of the fan casing.

6. The fan casing of claim 5, wherein an inner side of the fan casing includes a honeycomb structure.

7. The fan casing of claim 6, wherein the protective layer is positioned on an inner side of the fan casing.

8. The fan casing of claim 7, and further comprising at least one adhesive attaching the protective layer to the fiber-composite material of the fan casing.

9. The fan casing of claim 7, wherein the protective layer is attached to the fiber-composite material of the fan casing with ultrasonic techniques.

10. The fan casing of claim 9, wherein the burst protection arrangement includes a ductile layer.

11. The fan casing of claim 10, wherein the ductile layer includes at least one layer of a mesh of metallic rings wound in a continuous strip around the fiber-composite material of the fan casing with the protective layer.

12. The fan casing of claim 11, wherein the metallic rings of the mesh are made of at least one of aluminum, titanium, steel and alloys of those metals.

13. The fan casing of claim 12, and further comprising a bedding substance in which the mesh of metallic rings is fitted.

14. The fan casing of claim 1, and further comprising at least one sound-absorbing lining positioned on an inner side of the fan casing.

15. The fan casing of claim 1, wherein the protective layer is positioned on an outer side of the fan casing.

16. The fan casing of claim 1, wherein an inner side of the fan casing includes a honeycomb structure.

17. The fan casing of claim 1, wherein the protective layer is positioned on an inner side of the fan casing.

18. The fan casing of claim 1, and further comprising at least one adhesive attaching the protective layer to the fan casing.

19. The fan casing of claim 1, wherein the burst protection arrangement includes a ductile layer.

* * * * *